United States Patent

Tabata et al.

[11] 4,046,304
[45] Sept. 6, 1977

[54] PROCESS FOR PRODUCING METAL COMPOSITE MATERIAL

[75] Inventors: Sanetoshi Tabata, Hirakata; Toshiaki Takeuchi, Neyagawa, both of Japan

[73] Assignee: Teikoku Piston Ring Co., Ltd., Tokyo, Japan

[21] Appl. No.: 620,716

[22] Filed: Oct. 8, 1975

Related U.S. Application Data

[63] Continuation of Ser. No. 476,225, June 4, 1974, abandoned.

[30] Foreign Application Priority Data

Sept. 12, 1973  Japan .............................. 48-102211
Nov. 8, 1973   Japan .............................. 48-124930

[51] Int. Cl.$^2$ .......................................... B23K 19/00
[52] U.S. Cl. ................................ 228/187; 228/235; 228/263
[58] Field of Search ............... 228/116, 117, 190, 187, 228/233, 235, 263

[56] References Cited

U.S. PATENT DOCUMENTS

| 2,782,498 | 2/1957 | Mushovic et al. ............... 228/205 |
| 2,937,435 | 5/1960 | Brenner et al. ................ 228/263 X |
| 2,965,963 | 12/1960 | Batz et al. .................... 228/233 X |
| 3,258,839 | 7/1966 | Resnick ........................ 228/116 |
| 3,384,950 | 5/1968 | Ruf ............................. 228/205 X |
| 3,648,353 | 3/1972 | Anderson ....................... 228/190 X |
| 3,740,828 | 6/1973 | Buchinski et al. .............. 228/117 |
| 3,912,152 | 10/1975 | Forand ......................... 228/235 X |

Primary Examiner—Gary L. Smith
Assistant Examiner—K. J. Ramsey
Attorney, Agent, or Firm—Paul & Paul

[57] ABSTRACT

A metal composite material having an aluminium surface layer firmly bonded on a substrate material consisting of a metal other than aluminium is produced by cold pressure bonding the metal substrate material to an aluminium foil superimposed thereon, subjecting the bonded material to a diffusion heat treatment at a temperature lower than the melting points of both the aluminium foil and the substrate material and, if desired, hot pressure bonding the bonded material to an aluminium material superimposed on the aluminium foil layer of the bonded material at a temperature lower than the melting point but not lower than the recrystallizing point of the aluminium material.

1 Claim, 8 Drawing Figures

PROCESS FOR PRODUCING METAL COMPOSITE MATERIAL

This is a continuation of application Ser. No. 476,225, filed June 4, 1974, now abandoned The present invention relates to a process of producing a metal composite material having a thin aluminium layer firmly bonded on a metal substrate material consisting of a metal other than aluminium.

The term "aluminium" used herein refers to, unless otherwise indicated, technically pure aluminium and aluminium alloys.

The phrase "a metal other than aluminium" used herein refers to a metal which is diffusable into aluminum and into which aluminium is diffusable at a temperature lower than the melting points of both the metal and aluminium. This metal may be selected from Fe, Ti, Nb, Ta, Zr, Ni, Co, Cr, Mn, Be, Ag, Cu and alloys containing, as a base component metal, at least one of the above-mentioned metals.

Generally, aluminium materials and aluminium-coated materials are widely utilized in various fields, because they have high resistance to corrosion in an acid atmosphere and oxidation at an elevated temperature, and because, due to their pleasing appearance when used on exterior surfaces they are suitable for decorational uses.

The coating of metal material with aluminium is generally realized by a conventional hot dipping method or electroplating method using a non-aqueous medium. In the hot dipping method, the metal material to be coated is dipped into a hot bath of melted aluminium. This method has various disadvantages in that, for example, the coated aluminium layer is uneven in thickness and nonuniform in composition. Particularly, as the metal material to be coated is immersed in a melted aluminium bath have a temperature higher than the melting point of the aluminium, portions of the aluminium and the other metal diffuse into each other and form intermetallic compounds in the intersurface layer between the aluminium coating and the metal substrate layer. These intermetallic compounds have a high brittleness and, therefore, result in reduction in the workability of the aluminium-coated material. Accordingly, it is desirable that the aluminium be coated on the metal substrate material at a relatively low temperature.

The aluminium electroplating method for the metal substrate material can be effected at a low temperatue. However, this method is disadvantageous in that the non-aqueous medium used is flammable and harmful to the human body. Accordingly, it is desired to be able to apply the aluminium on the metal substrate material without using a flammable and harmful non-aqueous medium.

Under these circumstance, there have been developed various new types of metal composite materials for eliminating defects in properties of the conventional metal composite material and economizing consumption of metal material. However, when these newly developed composite materials are produced or utilized at an industrial scale, there are numerous difficulties in metal working, for example. cold pressure working and hot pressure working. To date no method of eliminating such difficulties has been found.

That is, in the case where two component metal materials having hardnesses very different from each other, for example Ti and Al, are bonded by a cold pressure bonding method into a composite material, the resultant composite material has a poor bonding strength. This is because the difference in hardness of the two component metal materials results in large differences in degree of deformation while they are passing through a rolling mill, degree of elongation after the rolling and degree of spring-back. These differences because a large shearing force between the component metal materials bonded into a composite material body and, consequently, a firm bond cannot be effected between the component metal materials.

On the other hand, the conventional hot pressure bonding method is disadvantageous in that all of the procedures including heat treatment and hot drawing, for example, hot rolling must be carried out under vacuum or within an inert gas atmosphere. This is because there is a tendency to produce an oxide film firmly fixed on the component metal material, for example, titanium and stainless steel materials, to be bonded to aluminium material, in the hot pressure bonding process. Such oxide film prevents a firm bonding of the component metal materials to each other. The necessity for the vacuum or inert gas atmosphere causes the hot pressure bonding apparatus to be of a large size and results in a high cost and complexity of the hot pressure bonding process. The above disadvantages make the hot pressure bonding method difficult to effect at an industrial scale.

An object of the present invention is to provide a process of producing, by a simple operation, a metal composite material having a thin aluminium layer firmly bonded to a substrate material consisting of a metal other than aluminium, which aluminium layer is effective for firmly bonding an aluminium material to the metal substrate material therethrough, and a metal composite material produced by the above process.

Another object of the present invention is to provide a process of producing, at an industrial scale, a metal composite material having a thin aluminium layer firmly bonded to a substrate material consisting of a metal other than aluminium, without formation of oxide film on the metal substrate material surface, and a metal composite material produced by the above process.

A further object of the present invention is to provide a process of producing a metal composite material with a thin aluminium layer firmly bonded to a substrate material consisting of a metal other than aluminium, without formation of intermetallic compounds of the other metal and aluminium in an intersurface layer between them, and a metal composite material produced by the above process.

A still further object of the present invention is to provide a process of producing a metal composite material having an aluminium layer firmly bonded to a substrate material consisting of a metal other than aluminium through a thin aluminium layer which has been preliminarily bonded to the metal substrate material, and a metal composite material produced by the above process.

The above-stated objects are accomplished by the process of the present invention which comprises superimposing an aluminium foil on a surface of a substrate material consisting of a metal other than aluminium, cold pressure bonding the aluminium foil to the metal substrate material at a draft of 5 to 40%, and subjecting said bonded material to a diffusion heat treatment at a temperature lower than the melting points of both the aluminium foil and the substrate material.

The term "draft" used herein refers to a ratio, in percentage, of reduction in thickness of metal material by pressing the metal material to its original thickness. That is, provided the original thickness of the metal material is T and the thickness of the pressed metal material is t, the following relationship is found.

Draft (%) = %100(T−t)/T

In the process of the present invention, the substrate material may consist of a metal selected from the group consisting of Fe, Ti, Nb, Ta, Zr, Ni, Co, Cr, Mn, Be, Ag, Cu and alloys containing, as a base component metal, at least one of the above mentioned metals. These metals are capable of diffusing into the aluminium at the diffusing heat treatment temperature. Also, aluminium is capable of diffusing into the above-mentioned metals at the above temperature.

The aluminium foil usable for the process of the present invention may consist of a technically pure aluminium or an aluminium alloy containing, for example, a small amount of silicon or magnesium.

The aluminium foil preferably has a thickness of 1 to 150 μ, and more preferably, 1 to 50 μ. Broadly speaking, in order to bond one component metal material to the other component metal material by way of cold pressure bonding, it is necessary to press the component material at a large draft. Even if the pressing is successively effected in a plurality of steps, it is necessary that the first pressing is effected at a draft of at least 30%. However, in the case where an aluminium foil, having a much smaller thickness than that of the substrate material, is pressed together with the substrate material, it is possible to cold pressure bond them even if the draft is relatively low and the substrate material has a relatively high hardness. This is because the pressure acting on the thin aluminium foil can be transferred with very high efficiency, to the intersurface between the aluminium foil and the substrate material through the thin foil, which requires only a very small portion of the pressure to deform it. Further, it should be noted that the aluminium foil can easily follow the deformation of the substrate material during pressing. Accordingly, according to the present invention, the aluminium foil can be cold pressure bonded to the substrate material at a relatively low draft of 5 to 40%. If the draft is lower than 5%, the resultant composite material has an insufficient bonding strength for practical use. On the other hand, if the draft is higher than 40%, the cold pressing results in an undesirable hardening of the composite material. This hardening causes high brittleness of the composite material.

In order to attain a firm bond, the aluminium foil and the substrate material are preferably preliminarily cleaned at the surfaces to be bonded. The cleaning of the foil and substrate materials may be effected by immersion in a degreasing liquid such as an organic liquid, an acid aqueous solution or an alkaline aqueous solution. The degreasing organic liquid may be methyl alcohol, ethyl alcohol, acetone, trichloroethylene or tetrachlorethylene. The degreasing acid aqueous solution may contain hydrochloric acid, sulfuric acid, oxalic acid sodium bichromate, or phosphoric acid. Also, the degreasing alkaline aqueous solution may contain sodium hydroxide, sodium carbonate, sodium silicate or sodium metasilicate. These degreasing liquids and solutions may contain a surface active agent.

The cold pressure bonding in the process of the present invention can be effected with the conventional apparatus, for example, cold rolling mills and cold drawing devices.

Further, the cold pressure bonding operation by a rolling mill may be effected under the backward stretch of the aluminium foil superimposed on the substrate material. By this backward stretch, the aluminium foil can be uniformly bonded to the substrate material.

After completing the cold pressure bonding step, the bonded materials are subjected to a diffusion heat treatment at a temperature lower than both of the melting points of both aluminium foil and the metal substrate material, preferably, not lower than 200° C, and more preferably, 300° to 450° C. By heating at the abovementioned temperature, the aluminium foil and substrate material can diffuse into each other so as to form a diffusion layer in the intersurface portion thereof. In this diffusion heat treatment, it should be noted that no intermetallic compound is produced in the diffusion layer. This is because the treatment is carried out at a relatively low temperature. If the diffusion treating temperature is lower than 200° C, the diffusion rates of aluminium and the metal substrate is very low and, therefore, the diffusion can not be completed within a period of time which is practical for industry. Also, if the temperature of the diffusion is higher than either the melting point of aluminium foil or the substrate material, undersirable intermetallic compounds are produced in the diffusion layer. These intermetallic compounds cause a low bonding strength of the composite material due to their high brittleness.

The diffusion heat treatment is carried out for a time period sufficient for completing the diffusion to the extent necessary, usually 5 minutes to 2 hours.

The above-stated process of the present invention has the following features.

1. The ratio in thickness of the aluminium foil to the sum of the substrate material and the aluminium foil, is very small. Generally, it is known that the smaller the thickness ratio, the larger tha stress acting vertically on the intersurface between the aluminium foil and the substrate material. The larger vertical stress results in the bonding strength of the composite material being large.

2. In the cold pressure bonding step, a shearing force which acts on the intersurface between the thin aluminium foil and the substrate material is absorbed by the substrate material having a very large thickness in ralation to that of the aluminium foil. Accordingly, a minor portion of the shearing force acts on the aluminium foil. In other words, the thin aluminium foil can easily follow the deformation of the substrate material.

3. When the aluminium foil and the substrate material are clean, they can diffuse into each other in the diffusion heat treatment step so as to form a metallurgically form bonding layer therebetween.

4. The thickness of the aluminium coating layer is easy adjustable by selecting aluminium foil which has the desired thickness.

The composite material produced by the above-stated

1. Even thickness of the coated aluminium layer.

2. Excellent workability. This is because no intermetallic compound is contained in the diffusion layer.

3. Uniform composition of the coated aluminium layer. This composition can be easily selected at will.

4. No change in quality of the substrate material. This is because cold rather than hot bonding is effected.

5. No pin holes in the aluminium layer.

6. Fixed working time period. That is, even if the thickness of the aluminium foil to be bonded is varied, the working time period is constant.

7. High freedom in selection of the substrate material from various metal materials.

The process of the present invention can further comprise the steps of superimposing an aluminium material on the aluminium foil surface of the bonded material and hot pressure bonding the superimposed aluminium material to the bonded material at a temperature lower than the melting point but not lower than the recrystallizing point of the aluminium material. Preferably, the hot pressure bonding is carried out at a temperature from 350° to 450° C. Also, it is preferable that the hot pressure bonding is effected at a draft of the superimposed materials of 5 to 60%. The time period for the hot pressure bonding may be set in response to the type, thickness and shape of the component materials to be bonded, and the bonding temperature and the draft applied to the component materials. During the hot pressure bonding step the aluminium material and the bonded material are reduced in thickness and enlarged in surface area. Even if oxide films are produced on the surfaces of the aluminium material and the thin aluminium layer of the bonded material, the oxide films can be broken during the hot pressure bonding step because the oxide films are very thin and non-malleable. That is, the oxide films can not follow the increase in surface areas of the component materials during the hot pressure bonding step. The breakageof the oxide film results in creation of a fresh surface of the component material to be bonded. Such fresh surface is not covered by the oxide film and is therefore, very effective to enhance the bonding strength of the resultant composite material. According, according to the process of the present invention, the aluminium material can be bonded to the other metal material without elimination of the oxide film thereon. Since the bonding of the aluminium material to the other metal material is realized through the thin aluminium layer which is firmly bonded to the other metal material through the diffusion layer, the bonding strength of the resultant composite material is very high. That is, the resultant composite material can be further deformed during further plastic working steps, for example, cold pressings, drawings, extrusions, rollings and bending, without pelling off of the component materials therefrom.

The composite material thus produced may be further subjected to a heat treatment at a temperature lower than all the melting points of the component metal materials to enhance the bnding strength thereof.

Broadly speaking, with the conventional cold pressure bonding method, it is very difficult to firmly bond two component metal materials having hardnesses very different from each other. However, the above difficulty is dissolved by the process of the present invention. Further, according to the process of the present invention, the aluminium material can be firmly bonded to the bonded material, without elimination of the oxide film present thereon. These are the important advantages of the process of the present invention.

The process of the present invention and the metal composite material produced by this process are more fully explained in the following description of specific embodiments of the present invention by referring to the accompanying drawngs, in which.

Figure 1:
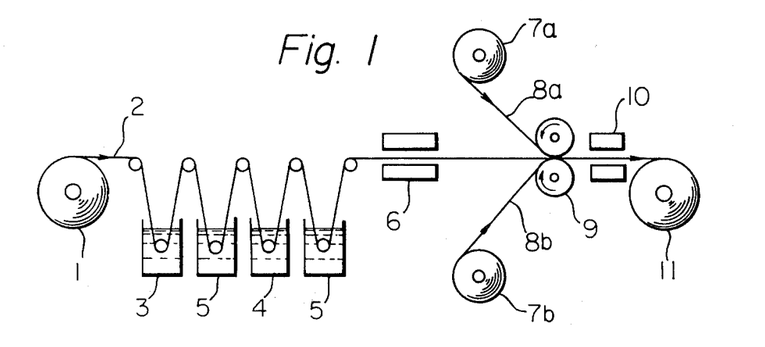
FIG. 1 shows a schematic view of an apparatus for carrying out the process of the present invention.

Referring to FIG. 1, a roll 1 supplies a metal sheet, 2 composed of a metal other than aluminium, for example, a stainless steel sheet, as a substrate material. The metal sheet 2 is degreased in a degreasing bath 3, washed with an acid aqueous solution in a bath 4 and rinsed with water in a bath 5. The metal sheet 2 thus cleaned is dried in a dryer 6 and, then, fed into a cold pressure bonding apparatus. Upper roll 7a and lower roll 7b supply aluminium foils 8a and 8b. The foils 8a and 8b are superimposed on upper and lower surfaces of the metal sheet 2, and the superimposed foils and sheet are fed into a cold rolling mill 9 to bond them into a composite sheet body. The composite material thus formed is fed into a diffusion heat treatment furnace 10, and the resultant composite sheet is wound up into a roll 11.

The process as illustrated in FIG. 1 is carried out as a continuous process. However, the process of the present invention may of course be effected discontinuously. Also, only one aluminium foil is bonded to one surface of the metal substrate material. The metal substrate material may be in the form of a sheet, a plate or other shapes.

Figure 2A:
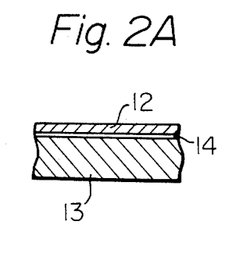
FIGS. 2A through 2C show cross-sectional views of embodiments of the composite materials produced by the process of the present invention, respectively.

Referring to FIG. 2A, a substrate plate 12 consisting of a metal other than aluminium, for example, Ti, stainless steel (SUS 304) and structural special steels (SS 41) is bonded with an aluminium plate 13 through a thin aluminium foil layer 14. The aluminium plate 13 may have a thickness either smaller, than, the same as or larger than that of the metal substrate plate 12.

Figure 2B:
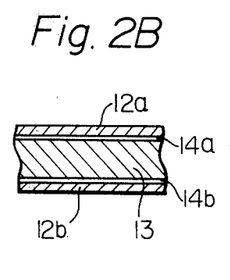

In FIG. 2B two metal substrate plates 12a and 12b are bonded to an aluminium plate 13 through thin aluminium foil layers 14a and 14b, respectively. The metal substrate plate 12a and 12b may be the same as or different from one another in type of metal or thickness. The aluminium plate 13 may have a thickness either smaller or larger than or the same as that of the either of the metal substrates 12a or 12b.

Figure 2C:
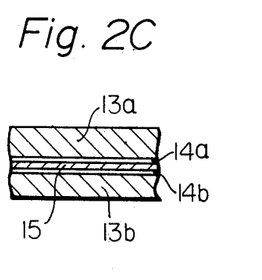

In FIG. 2C, a metal substrate plate 15 is bonded, on both surfaces thereof, to two aluminium plates 13a and 13b through thin aluminium foil layers 14a and 14b. The aluminium plates 13a and 13b may be the same or different from each other in type of aluminium and thickness.

The aluminium plates 13a or 13b may be either thicker or thinner than or the same as the substrate plate 15.

Figure 4:
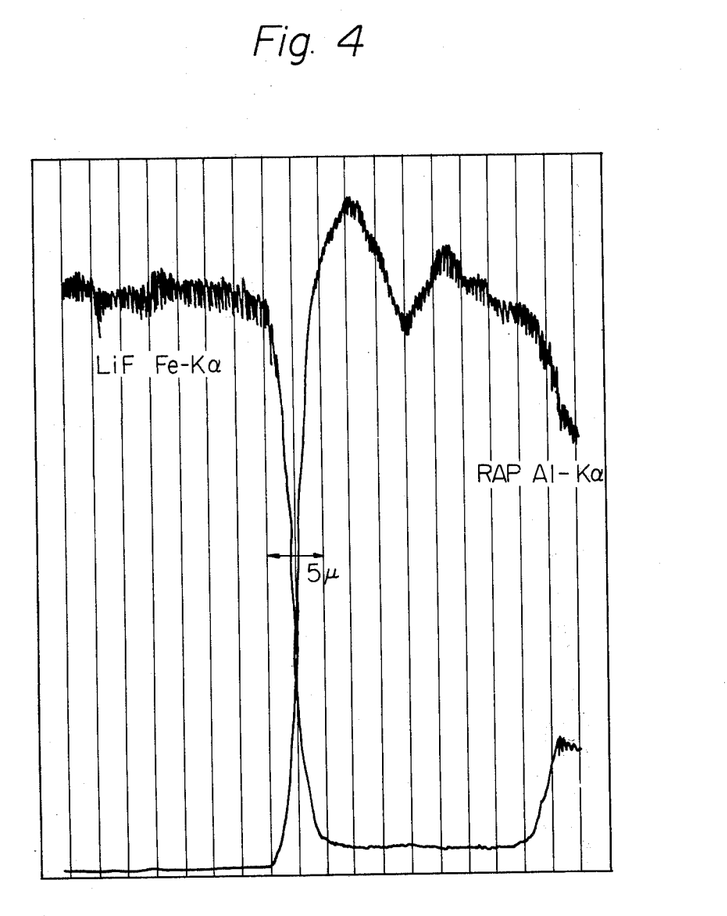
FIG. 4 is a diagram showing distribution of aluminium and iron in a diffusion layer in a metal composit material produced by the process of the present invention, and, FIG. 5 is a diagram showing distribution of aluminium and iron in a diffusion layer in a metal composite material produced by the conventional hot dipping method.

FIG. 4 shows distributions of aluminium and iron in the diffusion layer formed between the aluminium foil and a structural steel substrate which have been bonded by the process of the present invention. The cold pressure bonding was carried out at a draft of 22.7%. The bonded sheet was subjected to a diffusion heat treatment at a temperature of 400° C for 15 minutes.

The distributions of aluminium and iron were measured by way of an electron probe X-ray microanalysis at an accelerating voltage of 25 KV at an electron beam intensity of $2 \times 10^{-8}$A at a diameter of beam of 3 $\mu$. In this measurement, the speed of a recording chart was 40 mm/min and the speed of the test piece was 10 $\mu$/min. As a spectral crystal, rubidium acid phthalate (RAP) was used for aluminium and lithium fluoride (LiF) for iron.

From FIG. 4, it is obvious that the diffusion layer between the aluminium phase and the iron phase is very thin, less than 5 $\mu$, and includes no intermetallic compound therein. This type of diffusion layer results in no increase in brittleness of the bonding portion of the composite material.

Figure 5:
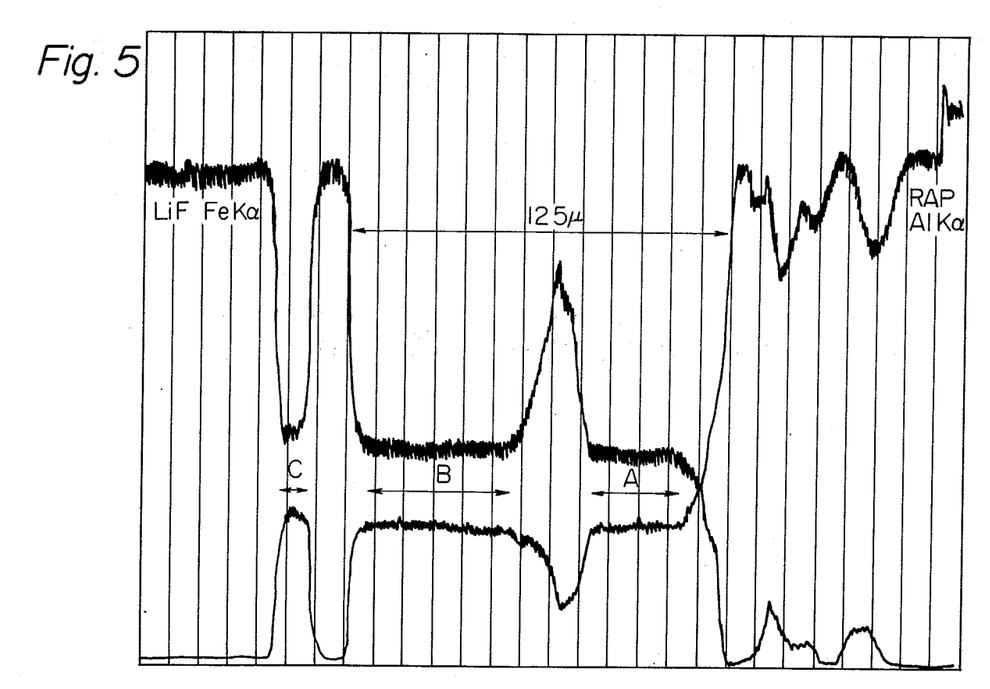

FIG. 5 shows distributions of aluminium and iron in the diffusion layer which has been formed by hot dipping a structural steel substrate into an aluminium melt at a temperature of 750° C for 50 seconds. The distributions are measured by the same method as in FIG. 4 except that the electron beam intensity was $3 \times 10^{-8}$A, the diameter of beam 1 $\mu$, the speed of chart 20 mm/min and speed of test piece 20 $\mu$/min.

In FIG. 5, the diffusion layer is relatively thick, more than 125 $\mu$, and aluminium and iron phases diffuse into each other in complicated cloud-like configurations. It should especially be noted that the FIG. 5, portions A, B and C of the diffusion layer contains aluminium and iron, each in a substantially constant amount. This indicates the fact that an intermetallic compound is formed in those portions. The intermetallic compound causes a relatively low bonding strength of the composite material due to a high brittleness thereof.

In the following examples, which are given for the purpose of illustrating the present invention, tensile strength and shearing strength of the composite plates were measured by the following method.

For the tensile strength measurement, a plurality of specimens of 25 mm width and 100 mm length were prepared from the composite plate. The middle 50 mm portion of the specimens was stretched up to other breakage to determine the tensile strength, yield point and breaking elongation.

Figure 3A:
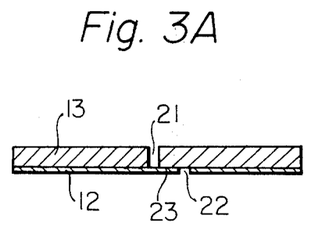
FIGS. 3A and 3B show explanatory views of specimens for bonding strength tests.
Figure 3B:
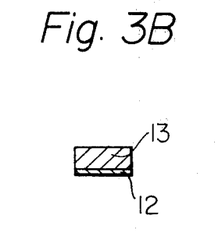

For the shearing strength measurement, a plurality of specimens having a 10 mm width, a 100 mm length and a configuration as shown in FIGS. 3A and 3B were prepared. Referring to FIGS. 3A and 3B, the aluminium plate 13 and the substrate plate 12 in the specimen were each divided by a break 21 and 22 into two parts so that the right upper part of the aluminium plate is bonded with the left lower part of the structure plate via a middle 3 mm width bonding zone 23. The specimen was subjected to stretching up to shearing of the composite material.

EXAMPLE 1

A titanium sheet having a thickness of 1.0 mm was cleaned by degreasing with trichloroethylene, rinsing with water, washing with an aqueous solution of 2% by weight of hydrogen fluoride, rinsing with water and the, brushing. An aluminium foil having a thickness of 15 $\mu$ was placed on a surface of the cleaned titanium sheet and cold pressure bonded using a rolling mill at a draft of 20% of the total thickness. The cold bonded sheet was subjected to a diffusion heat treatment using an electric furnace at a temperature of 350° C for an hour. A primary composite sheet was obtained, which was composed of a titanium substrate layer and a thin aluminium foil layer firmly bonded to the titanium layer through a very thin Ti-Al diffusion layer. An aluminium plate having a thickness of 5.0 mm was degreased with trichloroethylene. The aluminium plate was heated to a temperature of 450° C, and superimposed on the aluminium foil layer of the primary composite sheet. The superimposed plate and sheet were hot pressure bonded using a hot rolling mill at a draft of 40% at a temperature of 400° C. The composite plate thus produced was composed of a titanium substrate layer of the thickness of approximately 0.8 mm and an aluminium layer of a thickness of approximately 3.0 mm bonded to the titanium layer through the thin aluminium foil layer. The Al-Ti composite plate was heat-treated at a temperature of 360° C for an hour.

The Al-Ti composite plate was subjected to a bend test wherein the plate was bent at an angle of 90° in two opposite directions. No peeling of the titanium sheet from the aluminium plate was observed. That is, the titanium sheet was firmly bonded to the aluminium plate through the aluminium foil layer. The Al-Ti composite plate was suitable for bending.

EXAMPLE 2

A stainless steel sheet (SUS 304 which corresponds to AISI 304) with a thickness of 1.0 mm was degreased with an alkaline aqueous solution, rinsed with water, washed with an aqueous solution of 10% by volume of sulfuric acid and rinsed with water. The thus cleaned stainless steel sheet was superimposed on an aluminium foil with a thickness of 15 $\mu$. They were cold pressure bonded at a draft of 20% of the total thickness. The cold bonded sheet was subjected to a diffusion heat treatment at a temperature of 360° C for an hour. An 18-8 stainless steel sheet bonded with an aluminium foil layer through an Al-stainless steel diffusion layer, was obtained.

An aluminium plate of a thickness of 5.0 mm was degreased with trichloroethylene and heated to a temperature of 450° C. The heated aluminium plate was superimposed on the aluminium foil layer of the diffusion bonded stainless steel sheet. The superimposed stainless steel sheet and aluminium plate were hot pressure bonded at a draft of 40% at a temperature of 400° C to produce a composite plate. The resultant composite plate ws composed of a stainless steel substrate layer with a thickness of approximately 0.8 mm and an aluminium layer with a thickness of approximately 3.0 mm bonded to the stainless steel layer through a thin aluminium foil layer. The composite plate was subjected to heat treatment at a temperature of 360° C, for an hour to enhance the bonding strength thereof. The heat-treated composite plate was subjected to the same bend test as in Example 1. It was observed that the stainless steel sheet was firmly bonded to the aluminium plate and the composite plate was suitable for bending.

EXAMPLE 3

A rolled structural steel sheet (SS 41) having a thickness of 2.2 mm was cleaned in the same way as in Example 2. The cleaned sheet was interposed between two aluminium foils each having a thickness of 15 $\mu$. The sheet and foils were cold pressure bonded at a draft of 22.7% in the total thickness. The bonded sheet which had a thickness of approximately 1.7 mm, was subjected to a diffusion heat treatment at a temperature of 400° C for 15 minutes in the normal atmosphere. The resultant sheet had coating layers consisting of aluminium which were bonded to the steel layer by very thin Al-steel diffusion layers.

In order to determine resistance to oxidizing, the above-produced composite sheet was heated at a temperature of 800° C for 20 hours in an electric furnace, and the increase in weight of the composite sheet was measured.

For comparison, the same procedures as mentioned above were repeated for the same rolled structural steel sheet (SS 41) as used above. The increases of the composite sheet and the steel sheet in weight resulting from the oxidizing are indicated in Table 1.

Table 1

| Material | Increase in weight (mg/cm$^2$) |
| --- | --- |
| Composite Sheet | 7.6 |
| Steel Sheet | 72.2 |

The composite sheet prepared above was subjected to an anodizing process by the following procedures. The composite sheet was cleaned with trichloroethylene. The cleaned composite sheet was anodically oxidized in an aqueous solution of 15% by weight of sulfuric acid at a temperature of 20° C at a voltage of 12 V, for 10 minutes. Thereafter, the anodized composite sheet was immersed at a temperature of 60° C into an aqueous solution of 1.5% by weight of ammonium ferric oxalate. From the above immersion, the composite sheet was uniformly dyed yellow.

For comparison, the same procedures as above were repeated using a conventional aluminium coated steel sheet which had been produced by immersing a steel sheet into an aluminium melt at a temperature of 750° C for 1 minute. The conventional aluminium coated steel sheet was not uniformly dyed yellow. This means that the aluminium coating layer of the conventional composite sheet was not uniform in its thickness and composition.

EXAMPLE 4

An aluminium plate having a thickness of 5.0 mm which had been degresed and heated to a temperature of 450° C was placed on a surfaceof a composite sheet produced in the same manner as in Example 3, and hot-pressure bonded at a draft of 40% by the total thickness. The bonded composite plate was heat-treated at a temperature of 360° C for an hour. The resulting Al-Steel composite plate was subjected to a tensile strength test and a shearing test.

The tensile strength, the yield point and the breaking elongation were measured by the method as mentioned herebefore.

For the shearing test, a plurality of specimens were prepared. Referring to FIGS. 3A and 3B, the specimens comprised an aluminium layer 3 mm thick and a structural steel layer 0.8 mm thick, and had a width of 10 mm and a length of 100 mm. In each specimen, the middle portion to be sheared, which had a 3 mm length, was formed as indicated in FIG. 3A. The specimen was stretched up to shearing to determine the bonding strength of the aluminium layer and the structural steel layer in the middle portion.

The same Al-Ti composite plate as in Example 1 and the same Al-stainless composite plate as in Example 2 were subjected to the same tensile strength and shearing tests as stated above. The results of the test are shown in Table 2.

Table 2

| | Al-Ti (Ex. 1) | Al-Stainless Steel (Ex. 2) | Al-Steel (Ex. 4) |
| --- | --- | --- | --- |
| Tensile strength (kg/mm$^2$) | 18 | 22 | 16 |
| Yield Point (kg/mm$^2$) | 7 | 8 | 7 |
| Breaking Elongation (%) | 40 | 50 | 50 |
| Bonding Strength (kg/mm$^2$) | >7 | >7 | >7 |

In the shearing test none of the specimens began breaking at the bonding interface but, rather, they all began breaking at the aluminium layer at a load of 7 kg/mm$^2$. Accordingly, the true bonding strength of the bonding layers of the specimens could not be determined. However, it is sure that the bonding strength of the bonding layers is larger than 7 kg/mm$^2$.

What we claim is:

1. A process for producing metal composite material comprising the steps of:
   1. forming an aluminium layer bonded to a surface of a substrate material consisting of a metal other than aluminium by (a) superimposing an aluminum foil on the surface of the substrate material, (b) cold pressure bonding the foil and substrate at a draft of from 5 to 22.7 % (c) subjecting said bonded material to a diffusion heat treatment at a temperature of 200° to 400° C and then
   2. bonding an aluminium material to the bonded material produced by step (1) by (d) superimposing the aluminium material on said aluminium foil layer surface and (e) hot pressure bonding said superimposed aluminium material to said metal substrate material through said aluminium foil layer at a draft of said superimposed material of from 5 to 60% and at a temperature lower than the metling point but not lower than the recrystalizing point of said aluminium material, to thereby produce a composite material.

* * * * *

UNITED STATES PATENT OFFICE
CERTIFICATE OF CORRECTION

Patent No. 4,046,304          Dated September 6, 1977

Inventor(s) Sanetoshi Tabata, et al.

It is certified that error appears in the above-identified patent and that said Letters Patent are hereby corrected as shown below:

Column 4, line 40, after "larger" insert -- the --

Column 4, line 42, after "The" insert -- large --

Column 4, line 48, after "in" insert -- relation --

Column 4, line 55, after "metallurgically" insert -- firm --

Column 4, line 60, after "above-stated" insert -- process of the present invention has the following advantages."

Column 5, line 35, after "material" insert -- accordingly --

Column 5, line 46, after "without" insert -- peeling --

Column 5, line 51, after "the" insert -- bonding --

Column 7, line 59, "the" should be -- then --

Column 9, line 6, after "same" insert --test --

Column 9, line 50 "herebefore" should be -- hereinbefore --

UNITED STATES PATENT OFFICE
CERTIFICATE OF CORRECTION

Patent No. 4,046,304              Dated September 6, 1977

Inventor(s) Sanetoshi Tabata, et al.

It is certified that error appears in the above-identified patent and that said Letters Patent are hereby corrected as shown below:

Column 10, line 49, after "the" insert -- melting --.

Signed and Sealed this

Tenth Day of January 1978

[SEAL]

Attest:

RUTH C. MASON
*Attesting Officer*

LUTRELLE F. PARKER
*Acting Commissioner of Patents and Trademarks*